US010303950B1

(12) United States Patent
Bedi et al.

(10) Patent No.: US 10,303,950 B1
(45) Date of Patent: May 28, 2019

(54) AUTOMATED VIDEO CORRECTION

(71) Applicant: Adobe Inc., San Jose, CA (US)

(72) Inventors: Ajay Bedi, Hamirpur (IN); Sourabh Gupta, Noida (IN); Saurabh Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/847,004

(22) Filed: Dec. 19, 2017

(51) Int. Cl.
*G11B 27/031* (2006.01)
*G06K 9/00* (2006.01)

(52) U.S. Cl.
CPC ..... *G06K 9/00718* (2013.01); *G06K 9/00744* (2013.01); *G06K 9/00758* (2013.01); *G11B 27/031* (2013.01)

(58) Field of Classification Search
CPC ........... G06K 9/00744; G06K 9/00758; G11B 27/031
See application file for complete search history.

(56) References Cited

U.S. PATENT DOCUMENTS

| 6,757,027 B1* | 6/2004 | Edwards | H04N 5/262 |
| | | | 348/701 |
| 7,734,144 B2* | 6/2010 | Dimitrova | G11B 27/031 |
| | | | 348/700 |
| 9,633,275 B2* | 4/2017 | Cobb | G06K 9/3233 |
| 9,892,761 B2* | 2/2018 | Carter | G11B 27/105 |
| 9,977,992 B2* | 5/2018 | Diggins | G06K 9/4652 |
| 2016/0088287 A1* | 3/2016 | Sadi | H04N 13/254 |
| | | | 348/43 |

OTHER PUBLICATIONS

"Black Frame Detection for Splitting Video—VideoHelp Forum", retrieved from the Internet: https://forum.videohelp.com/threads/235951-Black-Frame-Detection-for-Splitting-Video, copy retrieved Nov. 30, 2017, 2 pages.
"FFmpeg Filters Documentation", retrieved from the Internet: http://www.ffmpeg.org/ffmpeg-filters.html#blackdetect74 of, copy retrieved Nov. 30, 2017, 2 pages.

\* cited by examiner

*Primary Examiner* — Thai Q Tran
*Assistant Examiner* — Jose M Mesa
(74) *Attorney, Agent, or Firm* — Finch & Maloney PLLC

(57) ABSTRACT

Automated video correction techniques are disclosed. In some examples, an example method may include identifying features in each video frame of the multiple video frames in a video, and identifying one or more major scenes in the video based on a matching of the features in each video frame. The method may also include, for each identified major scene, identifying a key reference frame based on the features in each video frame, identifying one or more bad video frames based on a comparison with the key reference frame, and identifying one or more sequences of bad video frames based on the identified one or more bad video frames. The video may then be corrected by removing the identified one or more sequences of bad video frames from the video.

20 Claims, 11 Drawing Sheets

AUTOMATED VIDEO CORRECTION

FIELD OF THE DISCLOSURE

This disclosure relates generally to digital image processing, and more particularly, to automated correction or removal of bad video frames in a video.

BACKGROUND

Mobile communication devices, such as mobile phones are now ubiquitous. In addition, most mobile phones include cameras and video capturing capabilities, which allow users the ability to record videos, including high definition videos. In addition, the portable and easy-to-use nature of the video capturing features on the mobile phones allow users to quickly and spontaneously capture videos when an unexpected opportunity presents itself. Yet, using mobile phones to capture videos in this manner, especially in the case of impromptu video capturing by unsophisticated or otherwise amateur users, commonly leads to poor or relatively low quality videos. For example, the video may include distorted, blurred, or jittery scenes resulting from the mobile phone moving or otherwise being unsteady during the video capture process. In addition, or alternatively, the video may include poor contrast or shadows or grainy areas resulting from poor lighting conditions. The video may also include occluded or otherwise blocked scenes, for example, as a result of the presence of an unexpected object between the mobile phone and the scene being captured. In a more general sense, videos captured by mobile phones are commonly of poor quality and may include black frames (fully or partially occluded) and bad frames (some amount of blurring, distortion, or other perceivable lack of clarity).

Digital image editing applications are available that provide sophisticated editing capabilities. For example, after capturing a video, a user can use many of these applications to, for instance, improve contrast and color quality within a given image. In addition, some such applications can be used to remove unwanted features and objects from the captured images. However, many of these editing applications require not only knowledge that the various editing special effects tools exist but also skill and expertise on the part of the user to properly use such tools. To this end, successful image editing can be very challenging for many users.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
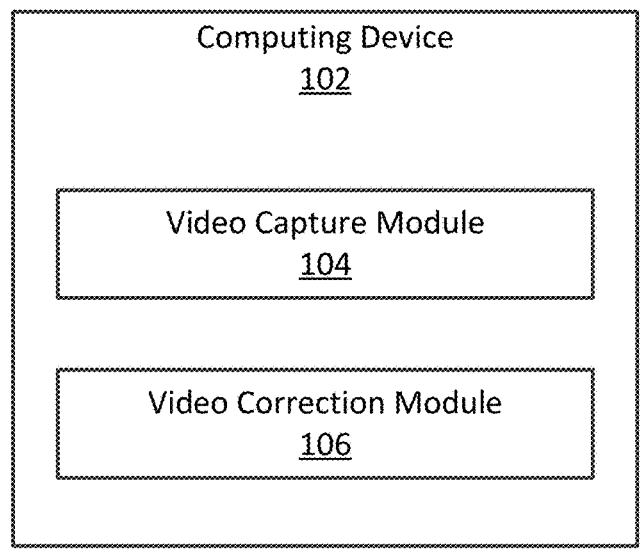
FIG. 1 illustrates selected components of an example automated video correction system, in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for automated correction of a video. A video is generally a sequence of two or more image frames arranged in a temporally sequential sequence. In accordance with an embodiment, a video is automatically corrected by identifying various types of bad video frames of the video, and removing bad video frame(s) from the video and/or fixing bad video frame(s) based on the type of bad video frame. In more detail, the video is processed to identify the major scenes captured in the frames of the video, and to identify a key reference frame for each identified major scene. According to some such embodiments, a key reference frame is a video frame in the major scene that includes the majority of the contents of the major scene as compared to the other video frames in the major scene. As such, the key reference frame has no or an otherwise low occurrence of perceptible defects (e.g., blurring, occlusion, etc.) in relation to the other video frames of the major scene. With key reference frames identified, the video is further processed to identify the bad video frames in each major scene, and to correct the identified bad video frames without user interaction. In some embodiments, the correction applied to a bad video frame depends on the type of bad video frame. In some cases, the video is first resized to a smaller size (i.e., fewer pixels). Resizing the video to a smaller size allows for faster processing of the video, for example, to identify and correct bad video frames in the video as described herein. In some embodiments, for instance, the video is resized from a 1024 pixel width video frame to a width of 512 pixel width video frame (e.g., 512 pixel long dimension video frame size). Provided a target reduced width, the height of the video is correspondingly adjusted to maintain the given aspect ratio of the video. As will be appreciated, the video may be resized from any original size down to any relatively smaller video frame width sizes, such as down to 384×216 from an original size of 512×288, or down to 1024×576 from an original size of 1280×720 (assuming a 16:9 aspect ratio), to allow for faster processing of the video. After the video correction process has run on the reduced size video, the subject video can be restored to its original size.

To identify the major scenes, one or more features in each video frame of the video are identified, according to some embodiments. Generally, features in an image are consistent over the video frames of the same major scene. An abrupt or large change in the features from one video frame to a succeeding video frame generally indicates a change from one major scene to another major scene in the video. Feature detection can be carried out using any suitable standard or proprietary feature detection techniques. In some embodiments, for example, an Oriented Features from Accelerated Segment Test (FAST) and Rotated Binary Robust Independent Elementary Features (BRIEF) (ORB) feature detector is used to identify the features in each video frame of the video. In the general sense, ORB is a fusion of the FAST corner detector and the BRIEF feature descriptor with numerous performance enhancement modifications. The features in each video frame may be identified using FAST and applying a corner measure, such as the Harris corner measure. Once the features are identified, the major scenes in the video can be identified based on a match or comparison of the features in successive video frames. In some embodiments, for example, ORB and, in particular, BRIEF is used to match the features between video frames. For example, starting from the beginning of the video, a video frame is selected as a current video frame (Cf), and the features of the current video frame are matched with the immediately preceding video frame (N). That is, the features of the current video frame (Cf) are searched for in the immediately preceding video frame (Pf), and if a feature of the current video frame (Cf) is found in the immediately preceding video frame (N), then a feature match can be declared. If the number of features matched satisfies a new scene threshold (e.g., less than 70 percent of the features matched, or some other suitable threshold indicative of non-matching major scenes), the current video frame is identified as a potential new major scene start frame. In this case, since there is a lack of matching features between the current video frame and immediately preceding video frame, the current video frame can be considered to be a potential start of a new (e.g., a different) major scene in the video. Otherwise, if the number of features matched does not satisfy the new scene threshold, the current video frame is presumed to be part of the same major scene as the immediately preceding video frame and therefore not identified as a potential new major scene start frame. In some embodiments, the new scene threshold is a tunable parameter. For example, the new scene threshold may be specified by a user (or system administrator) based on a desired performance. In any such cases, setting the new scene threshold to a larger number may increase accuracy in determining the beginning and end of major scenes, but decrease performance (e.g., by increasing the number of pixels and features that are processed to determine whether a major scene change has occurred).

In some embodiments, a match of a feature between a current video frame and an immediately preceding video frame is performed within a match window in the immediately preceding video frame. Generally, between two successive video frames, a feature at a specific location in one video frame does not move far from the specific location in the next video frame due to the frame rate (e.g., 24 frames per second, 30 frames per second, 60 frames per second, etc.) of the video. Accordingly, a search of the immediately preceding video frame for a feature at a specific location in the current video frame is performed within a search window that encompasses the corresponding specific location in the immediately preceding video frame. As an example, suppose a feature A is located at pixel location (30, 30) in the current video frame. In matching feature A in the immediately preceding video frame, a search of a search window that encompasses pixel location (30, 30) is made in the immediately preceding video frame. That is, the entire immediately preceding video frame is not searched to match a feature. The size of the search window may be set to a suitable size, such as 48 pixels×48 pixels, 64 pixels×64 pixels, or any other suitable size, and may be tunable based on a desired performance. In any such cases, setting the search window to a larger size may increase accuracy (e.g., search of a larger area to locate a feature), but decrease performance (e.g., searching a larger area requires more processing power).

In some embodiments, a specific percentage, such as an N %, of the identified features in a current video frame are matched with an immediately preceding video frame to determine whether the current video frame is a start of a new major scene. Similar to the new scene threshold, the specific percentage, N, may be set to a suitable value, such as 75%, and be tunable, for example, to a larger value based on a desired performance. Additionally or alternatively, the number of features matched between the current video frame and the immediately preceding video frame may be capped at a specific maximum number of features to match value, such as 100, . . . , 400, 425, 450, 475, 500, 525, etc. Similar to both the new scene threshold and the specific percentage, N, the specific maximum number of features to match value may be tunable based on a desired performance. In other embodiments, any one of other suitable feature detection and matching techniques, such as scale invariant feature transform (SIFT) and speeded up robust features (SURF), may be used to identify the features in video frame and match the features between video frames.

To ensure that a video frame identified as a potential new major scene start frame is a start of a new major scene and not merely a bad video frame, in some embodiments, the potential start of the new major scene is cross-verified for a specific number, K, of successive video frames. That is, the new scene threshold needs to be satisfied for the next K successive video frames (e.g., the number of features matched for each of the next K successive video frames satisfies the new scene threshold when the features of each of the next K successive video frames are matched with the current immediately preceding video frame Pf) for a new scene confirmation threshold to be satisfied. Here, the features of each of the next K successive video frames are matched with current Pf since Pf is the potential end of the previous major scene. If the new scene confirmation threshold is satisfied, the potential new major scene start frame indication is updated (changed) to a new major scene start frame indication. That is, the current video frame, Cf, that is currently identified as a potential new major scene start frame is now identified (e.g., cross-verified) as a new major scene start frame. Otherwise, if the new scene confirmation threshold is not satisfied, the potential new major scene start frame indication is removed from the current video frame, Cf. That is, the current video frame, Cf, that is currently identified as a potential new major scene start frame is no longer identified as a start or a potential start of a new major scene in the video (e.g., the cross-verification failed). The specific number of successive video frames, K, may be set to a number of video frames, such as 30 video frames, 45 video frames, 60 video frames, or any other value, that is likely to confirm with a degree of confidence a start of a new major scene. By way of example, for a video captured at 60 frames per second, setting K to 60 video frames has the effect of cross-verifying a start of a new major scene for one second of captured video. Likewise, for a video captured at 30 frames per second, setting K to 60 video frames has the effect of cross-verifying a start of a new major scene for two seconds of captured video. In some embodiments, the specific number of successive video frames, K, may be set based on the frame rate of the video. In other embodiments, the specific number of successive video frames, K, may be set based on the length (running time) of the video. In still other embodiments, the specific number of successive video frames, K, may be set based on the type of content (e.g., outdoor scene, indoor scene, sporting event, people event, etc.) captured in the video.

A key reference frame in each major scene in the video is identified based on a match or comparison of the features between the video frames in each major scene. For example, for a major scene, the features in each video frame are matched with each of the other video frames in the major scene to determine a total number of times the features of a video frame matched with any of the other video frames in the major scene. A mean number of features matched for each video frame can be determined from the total number of times the features in each video frame matched, and the video frames may be sorted according to the respective mean number of features matched. The video frame with the largest mean number of features matched in each major scene is identified as a key reference frame for that major scene, according to some embodiments. As will be appreciated, a major scene may have multiple key reference frames. As such, a video frame in a major scene that includes the largest number of features in common with all other video frames in the major scene is selected as a key reference frame in the major scene. That is, the identified key reference frame in the major scene is a video frame that includes the majority of the scene contents that the major scene represents.

Bad video frames in each major scene in the video are identified based on a matching of the features identified for each video frame in a major scene. In some embodiments, the bad video frames include totally bad video frames, which include a majority of bad content (e.g., the majority of a video frame is bad) and are to be removed from the video. For example, a video frame is presumed to include a majority of bad content when, for instance, more than 70% of the features in the video frame fail to match with the key reference frame of the major scene. In some embodiments, for instance, the totally bad video frames in a major scene are those video frames that differ extensively when compared with a key reference frame in the major scene (e.g., the features in the totally bad video frame differ extensively from the features in the key reference frame). For each major scene, the features of each video frame are matched with the key reference frame. If a number of features matched for a video frame satisfies (i.e., the number of features matched is less than) a totally bad frame threshold, the video frame is identified as a totally bad video frame. The totally bad frame threshold may be set to a suitable value, such as 15%, 20%, 25%, 30%, or any other suitable value. The totally bad frame threshold may be tunable based on a desired performance. Once all the video frames in a major scene are processed in this manner to identify the totally bad video frames, sequences of totally bad video frames may be identified. For example, suppose a $10^{th}$, $11^{th}$, $12^{th}$, $13^{th}$, and $25^{th}$ video frames in a major scene are identified as totally bad video frames. In this example, one sequence of totally bad video frames may include the $10^{th}$ through $13^{th}$ video frames, with the $10^{th}$ video frame the start of the sequence and the $13^{th}$ video frame being the end of the sequence, and another sequence may include the single $25^{th}$ video fame as both the start and end of the sequence. The video can then be corrected by removing the identified sequences of totally bad video frames from the video. The resulting clips of the video can then be combined using any suitable technology to merge or combine video clips. In some embodiments, a small number of additional video frames before the start and/or after the end each sequence of totally bad frames may be removed in addition to each sequence of totally bad video frames to correct the video. For example, additional video frames in addition to a sequence of totally bad frames may be removed until a suitable overlap, such as 65%, 70%, 75% overlap, or any other suitable value, of features between the two merged video frames is achieved. Removing the additional video frames before and/or after a sequence of totally bad video frames may provide a smooth or smoother transition (e.g., no sudden jump) when the video clips are combined.

The bad video frames may additionally or alternatively include partially bad video frames, which include small defects (e.g., a small area or areas, or an otherwise minority of the video frame is bad) and can be automatically fixed. The partially bad video frames can be identified based on an adaptive match or comparison of the features in successive video frames. The partially bad video frames in a major scene are those video frames that differ extensively in small portions of the video frame when compared with an immediately preceding video frame (e.g., the features in the partially bad video frame differ extensively in small areas from the features in the immediately preceding video frame). For each major scene, the video frames are first divided into tiles of a specific size, such as 64 pixels×64 pixels, to perform the adaptive matching, which is a matching of the features in corresponding tiles between successive video frames. Again, a partially bad video frame is a video frame where the features differ extensively from an immediately preceding video frame in certain portions of the video frame, while the features in the remaining portions of the video frame do not extensively differ. The adaptive matching of the tiles allows for the identification of such certain portions of a video frame that include an extensive difference in the features. For each video frame in a major scene, the features in a video frame are adaptively matched with an immediately preceding video frame. That is, the features in each tile of a video frame are adaptively matched with the corresponding tile of an immediately preceding video frame. If a number of features adaptively matched for any tile in a video frame satisfies (i.e., the number of features matched is less than) a partially bad frame threshold, the video frame is identified as a partially bad video frame, and the bad tiles in the partially bad video frame are identified (e.g., marked, tracked, etc.). The bad tiles in the partially bad video frame are the tiles that did not satisfy the partially bad frame threshold (e.g., the portions of the partially bad video frame where the features differ extensively from the immediately preceding video frame). The partially bad frame threshold may be set to a suitable value, such as 55%, 60%, 65%, or any other suitable value. The partially bad frame threshold may be tunable based on a desired performance. Once all the video frames in a major scene are processed in this manner to identify the partially bad video frames and the bad tiles in each partially bad video frame, neighboring bad tiles in each partially bad frame may be combined in a connected fashion to create a larger bad tile. The bad tiles, including any larger bad tiles, in a partially bad video frame are the areas (portions) of the video frame that include the small defects (e.g., bad portions) that are to be fixed. For example, suppose two adjacent tiles and one outlier tile are identified as being bad tiles in a partially bad video frame. In this example, the two adjacent bad tiles may be combined as neighboring bad tiles into one larger bad tile, and the outlier bad tile may be another bad tile in the partially bad video frame. As such, this example partially bad video frame includes two areas that include small defects that are to be fixed. In some embodiments, two bad tiles that are not neighbors but are within a specific distance, such as 40 pixels, 50 pixels, 60 pixels, etc., of each other may be combined to create a single larger bad tile. Sequences of partially bad video frames may be identified based on the bad tiles. For example, suppose a $15^{th}$, $16^{th}$, $17^{th}$, $24^{th}$, and $25^{th}$ video frames in a major scene are identified as partially bad video frames, and the $15^{th}$, $16^{th}$, and $17^{th}$ partially bad video frames include tile 3 as a bad tile and the $24^{th}$ and $25^{th}$ partially bad video frames include tile 4 as a bad tile. In this example, one sequence of partially bad video frames may include the $15^{th}$ through $17^{th}$ video frames, and another sequence of partially bad video frames may include the $24^{th}$ and $25^{th}$ video fame. The video can then be corrected by fixing the small defects in the identified bad tiles in the partially bad video frames.

A defect in a bad tile may be fixed by determining a mask area (also interchangeably referred to herein as a "mask") for the defect. In some cases, the mask area may be an area that is larger than the defect. In any such cases, the mask area is the area (portion) of the partially bad video frame that needs to be patched (e.g., filled) with content from a good video frame or video frames in the same major scene. For example, the partially bad video frame can be aligned with the good video frame, and the content for the mask area can be copied from the good video frame to patch the mask area in the partially bad video frame. To align the partially bad video frame and the good video frame, the features of the two video frames can be matched, for example, using a homography matrix, and the good video frame can be backward-warped to align with the partially bad video frame. The good video frame from which to obtain the content for the mask area in the partially bad video frame may depend on the type of defect. If the defect is stationary between successive partially bad video frames (e.g., a non-moving occlusion), the good video frame can be a neighboring video frame that does not contain the defect. In the case of a stationary defect, a neighboring video frame that does not have the defect contains the right content for the mask area. Alternatively, if the defect is not stationary but moving between successive partially bad video frames (e.g., a moving occlusion), the good video frame can be the key reference frame of the major scene. In the case of a moving defect, a neighboring video frame may not contain the right content for the mask area since the defect (e.g., occlusion) is moving between video frames.

As used in this disclosure, the term "feature" refers, in addition to its ordinary meaning, to a piece of information that describes a characteristic of an image captured in a video frame. A feature may be at a pixel location (pixel level), and is a unique point or characteristic in the image. For example, a feature may be a specific structure in an image such as a point, edge, object, etc. A feature may also be a distinguishing "kernel" or "window", such as a 3 pixel×3 pixel window, a 9 pixel×9 pixel window, to name a few examples, in an image. For example, an image that is entirely black or entirely white will not have any unique characteristics that represent the image since all the distinguishing windows that represent a feature will not be unique. Conversely, an image that includes a boundary of black and white portions (areas) will have at least one distinguishing window in which some portions of the distinguishing window contain black pixels and other portions of the distinguishing window contain white pixels. As such, this distinguishing window can be a unique representation (characteristic) of the image at that boundary. In a more general sense, an image commonly includes numerous objects and numerous shades of colors, which results in variation, and possibly a high degree of variation, in the pixel values in the image and, as a result, any point in the image can be a feature.

Example System

Turning now to the figures, FIG. 1 illustrates selected components of an example automated video correction system 100, in accordance with at least some embodiments described herein. As depicted, system 100 includes a computing device 102, which further includes a video capture module 104 and a video correction module 106. In various embodiments, computing device 102 may be a mobile device, such as a mobile phone, a tablet computing device, and a smart phone, to name a few examples, and be configured to execute video capture module 104 and video correction module 106. Video capture module 104 is configured to provide capturing of a video using a camera (not depicted) of or coupled to computing device 102. Video correction module 106 is configured to receive or retrieve a video and perform automated correction of the video as described above, and as will be described in further detail with respect to FIGS. 2, 3, 4, 5, and 6.

In various embodiments, additional components (not illustrated, such as a processor, display, user input device, non-transitory memory, etc.) or a subset of the illustrated components can be employed without deviating from the scope of the present disclosure. For instance, other embodiments may integrate the various functionalities of modules 104 and 106 into fewer modules (e.g., one) or more modules (e.g., three or four, or more). In addition, further note that the various components of computing device 102 may all be in a stand-alone computing system according to some embodiments, while in others, may be distributed across multiple machines. For example, module 106 may be provided in a computing system distinct from computing device 102. In a more general sense, the degree of integration and distribution of the functional component(s) provided herein can vary greatly from one embodiment to the next, as will be appreciated in light of this disclosure.

Figure 2:
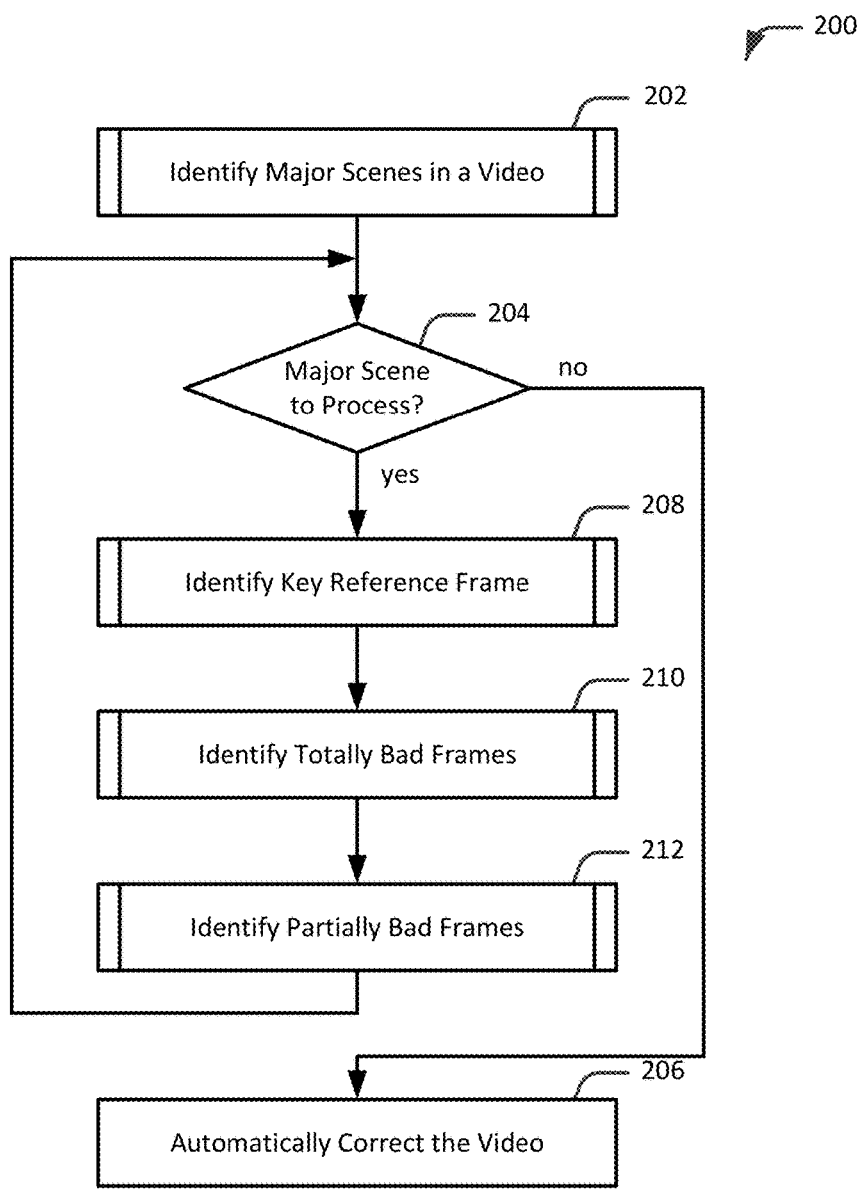
FIG. 2 is a flow diagram illustrating an example process for automated correction of a video, in accordance with at least some embodiments described herein.
Figure 3:
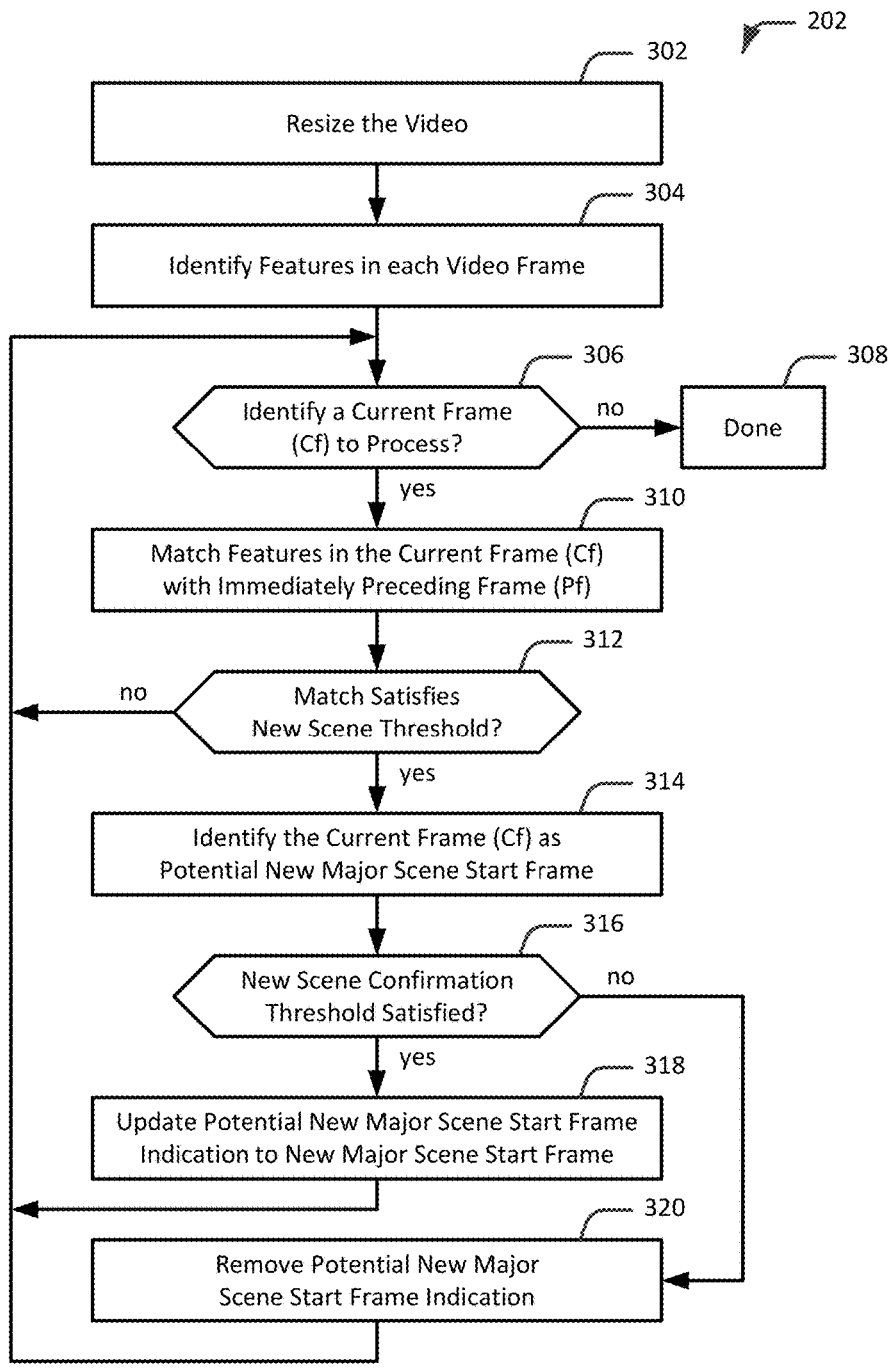
FIG. 3 is a flow diagram illustrating an example process to identify major scenes in a video, in accordance with at least some embodiments described herein.
Figure 4:
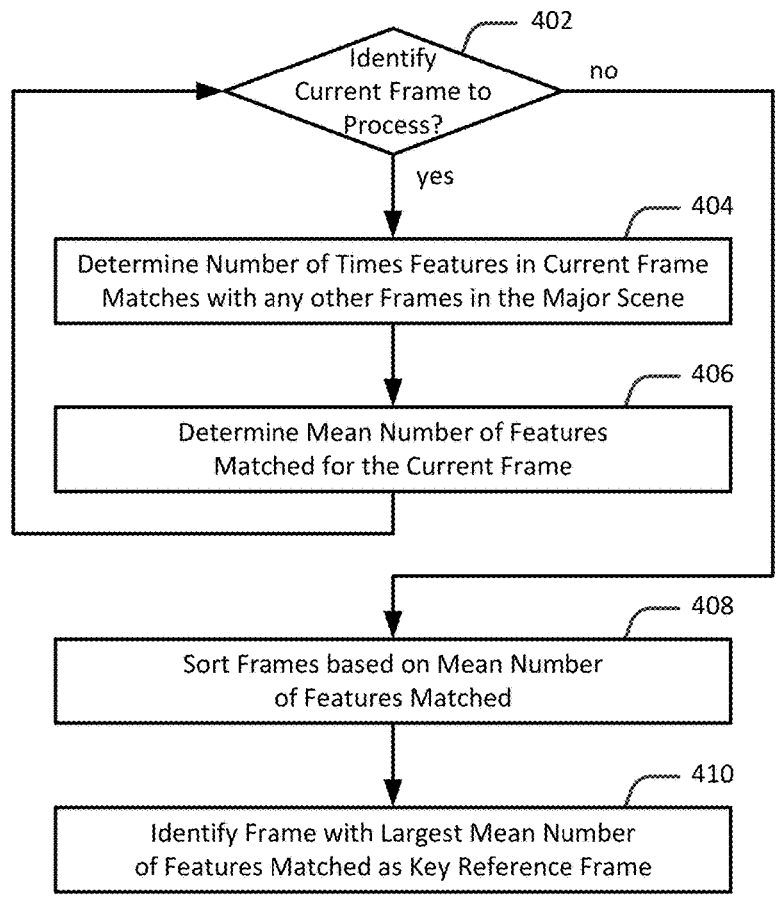
FIG. 4 is a flow diagram illustrating an example process to identify a key reference frame in a major scene, in accordance with at least some embodiments described herein.
Figure 5:
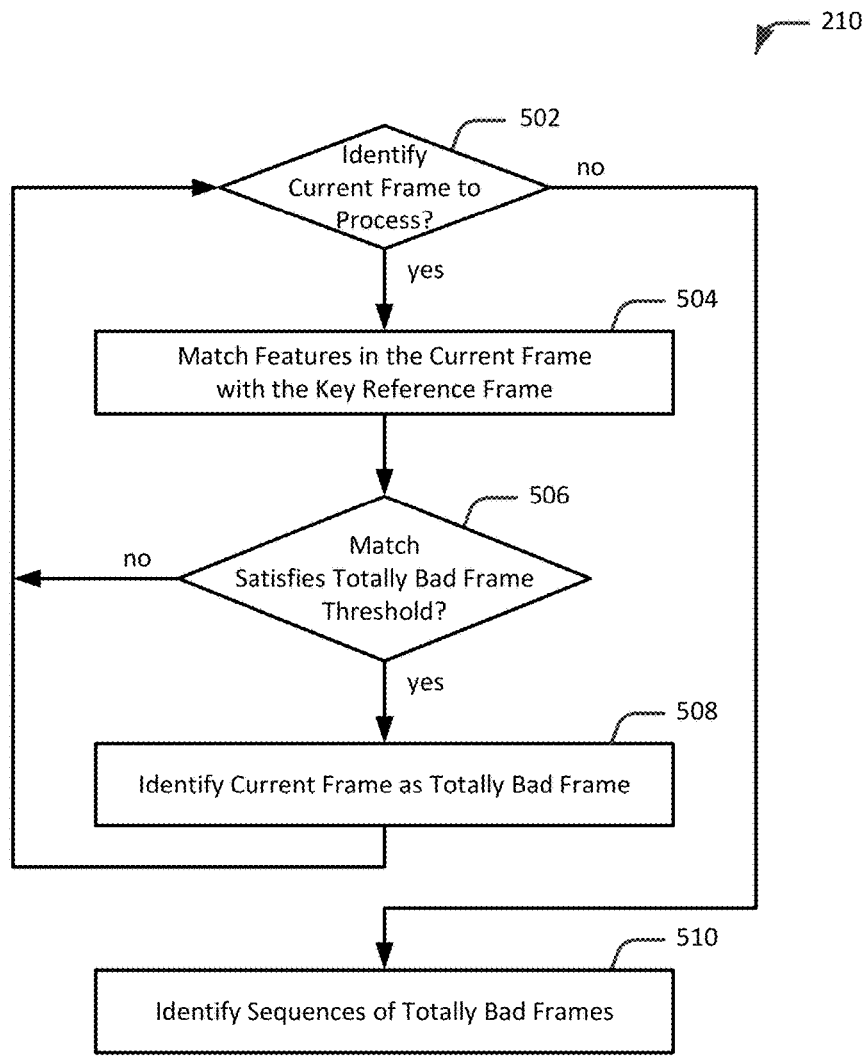
FIG. 5 is a flow diagram illustrating an example process to identify totally bad video frames in a major scene, in accordance with at least some embodiments described herein. In some such embodiments, a "totally bad" video frame as used herein generally refers to a video frame in a major scene in which more than 70% of its features fail to match with the key reference frame of the major scene, as will be further explained below.
Figure 6:
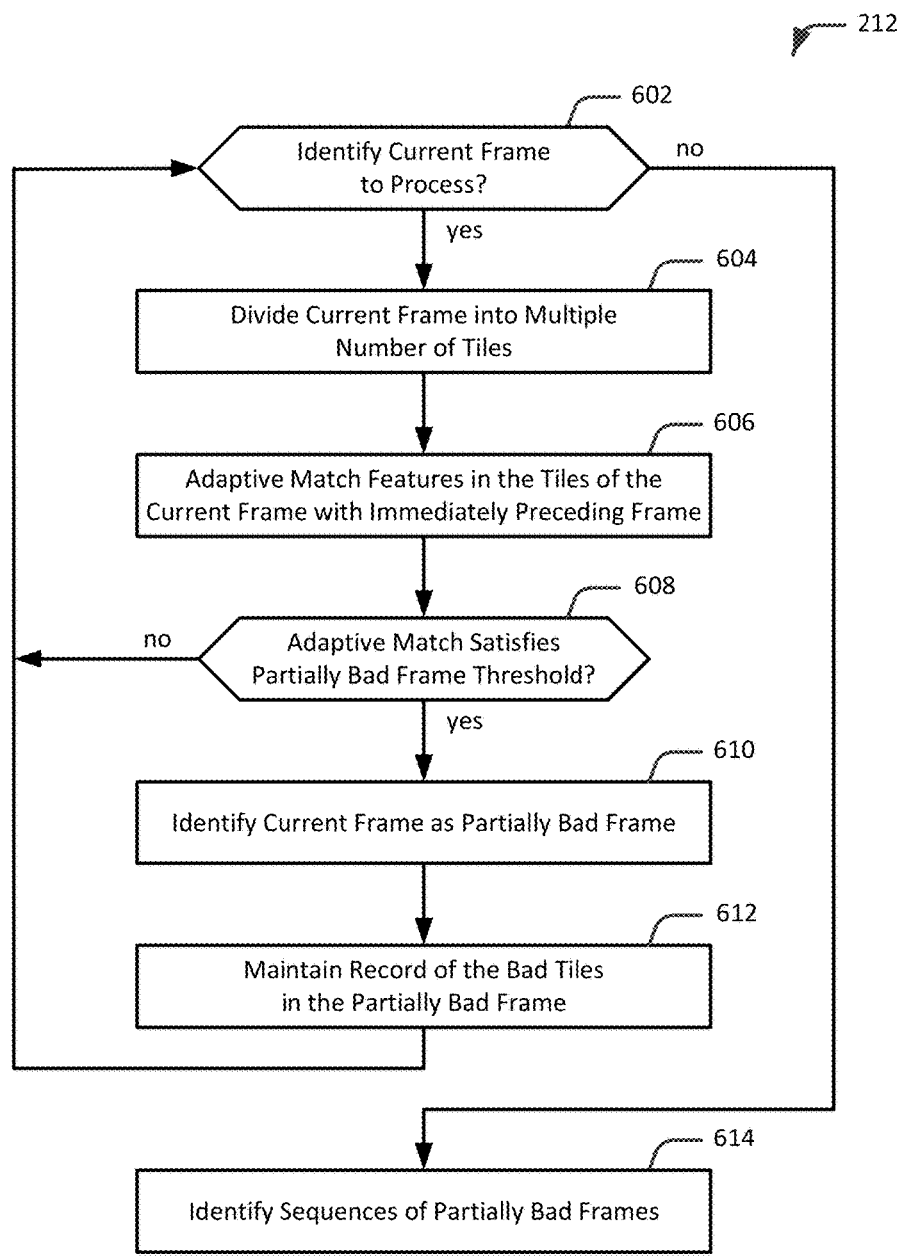
FIG. 6 is a flow diagram illustrating an example process to identify partially bad video frames in a major scene, in accordance with at least some embodiments described herein. In some such embodiments, a "partially bad" video frame as used herein refers to a video frame in a major scene that differs extensively in small portions of the video frame when compared with an immediately preceding video frame, as will be further explained below.

FIG. 2 is a flow diagram 200 illustrating an example process for automated correction of a video, in accordance with at least some embodiments described herein. FIG. 3 is a flow diagram illustrating an example process to identify major scenes in a video, in accordance with at least some embodiments described herein. FIG. 4 is a flow diagram illustrating an example process to identify a key reference frame in a scene, in accordance with at least some embodiments described herein. FIG. 5 is a flow diagram illustrating an example process to identify totally bad video frames in a major scene, in accordance with at least some embodiments described herein. FIG. 6 is a flow diagram illustrating an example process to identify partially bad video frames in a major scene, in accordance with at least some embodiments described herein. The operations, functions, or actions illustrated in the example processes of flow diagram 200 and the flow diagrams depicted in FIGS. 3-6 may in some embodiments be performed by automated video correction system 100 and, more particularly, video correction module 106 of computing device 102 of FIG. 1. The operations, functions, or actions described in the respective blocks of the example processes of flow diagram 200 and the flow diagrams depicted in FIGS. 3-6 may also be stored as computer-executable instructions in a computer-readable medium, such as memory 1104 and/or data storage 1106 of a computing system 1100. The processes may be performed by components of computing device 102.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 2, a computing device, such as computing device 102, which includes video correction module 106 may perform automated correction of a video. By way of an example use case, a captured video may be input or otherwise provided to video correction module 106 to perform automated correction of the video. As depicted by flow diagram 200, the process may begin with block 202, where video correction module 106 identifies the major scenes in the video.

FIG. 3 is a flow diagram illustrating an example process to identify major scenes in a video, in accordance with at least some embodiments described herein. As depicted, the process to identify the major scenes in the video may begin with block 302, where video correction module 106 resizes the video to a smaller size for improved processing of the video. For example, video correction module 106 may resize the video to 512 pixel long dimension video frame size. As will be appreciated, the resized video should not be of a size as to cause loss of the features in the images. That is, the size of the resized video should still be of a size that maintains the features in the images.

Block 302 may be followed by block 304, where video correction module 106 identifies the features in each video frame. For example, video correction module 106 may use an ORB feature detector to identify the features in each video frame of the video. Having identified the features in each video frame, video correction module 106 processes the video frames in sequence, for example, starting from the first video frame of the video, to identify the major scenes in the video based on a matching of the features in each video frame with an immediately preceding video frame.

Block 304 may be followed by decision block 306, where video correction module 106 checks to determine whether there is a current video frame (Cf) of the video to process. Here, video correction module 106 is checking to determine whether there is a video frame that still needs to be processed to determine a possible new major scene in the video. If video correction module 106 determines that there is no more video frame to process, decision block 306 may be followed by block 308, where video correction module 106 completes processing of the video frames in the video for identification of major scenes in the video. At this stage, video correction module 106 would have processed the video frames of the video and identified the major scenes in the video.

Otherwise, if, at decision block 306, video correction module 106 determines that there is a video frame (e.g., the next video frame in the sequence) to process, video correction module 106 identifies the video frame as a current video frame (Cf). Having identified a current video frame (Cf) to process, decision block 306 may be followed by block 310, where video correction module 106 matches the features of the current video frame (Cf) with an immediately preceding video frame (N). For example, video correction module 106 may use ORB to match the features between the current video frame (Cf) and the immediately preceding video frame (Pf). In the case where the current video frame (Cf) is the first video frame in the video, there is no video frame that immediately precedes the current video frame (Cf), and video correction module 106 identifies the current video frame (Cf) as a new major scene start frame. That is, the first video frame in the video is identified as a start of a major scene in the video. In some embodiments, video correction module 106 searches a respective match window in the immediately preceding video frame (Pf) to match each of the features of the current video frame (Cf).

Block 310 may be followed by decision block 312, where video correction module 106 checks to determine whether the match of the features in the current video frame (Cf) with the immediately preceding video frame (Pf) satisfies a new scene threshold. That is, video correction module 106 checks to determine whether the number of features in the current video frame (Cf) that matched with (e.g., were found in) the immediately preceding frame (N) is less than the new scene threshold. If video correction module 106 determines that the new scene threshold is satisfied (i.e., the number of features in the current video frame (Cf) that matched in the immediately preceding video frame (N) is less than the new scene threshold), decision block 312 may be followed by block 314, where video correction module 106 identifies (e.g., indicates) the current video frame (Cf) as a potential new major scene start frame. Here, a significant number of features in the current video frame (Cf) not matching with the immediately preceding video frame (Pf) serve as an indication that there is sufficient difference between the contents of the current video frame (Cf) and the immediately preceding video frame (Pf) to consider the current video frame (Cf) as a potential start of a new major scene in the video. In some embodiments, video correction module 106 matches a specific percentage, N, of the features in the current video frame (Cf) with the immediately preceding video frame (Pf) to make the determination as to whether the current video frame (Cf) is a potential new major scene start frame.

Block 314 may be followed by decision block 316, where video correction module 106 checks to determine whether a new scene confirmation threshold is satisfied. Here, video correction module 106 is cross-verifying the indicated potential start of a new major scene by the current video frame (Cf) for a specific number, K, of succeeding video frames to ensure that the current video frame (Cf) is in fact a start of a new major scene in the video. If video correction module 106 determines that the new scene confirmation threshold is satisfied, decision block 316 may be followed by block 318, where video correction module 106 updates the potential new major scene start frame indication associated with the current video frame (Cf) to a new major scene start frame indication. That is, video correction module 106 identifies the current video frame (Cf) that was previously identified as a potential new major scene start frame as a new major scene start frame. Video correction module 106 also identifies the immediately preceding video frame (Pf) as an end of a previous major scene in the video. Block 318 may be followed by decision block 306, where video correction module 106 checks to determine whether there is another video frame (e.g., a next video frame in the sequence) to process.

Otherwise, if, at decision block 316, video correction module 106 determines that the new scene confirmation threshold is not satisfied, decision block 316 may be followed by block 320, where video correction module 106 removes the potential new major scene start frame indication from the current video frame (Cf). That is, failing to cross-verify the potential start of a new major scene for the specific number, K, of succeeding video frames, video correction module 106 determines that a new major scene is not started by current video frame (Cf), and no longer identifies the current video frame (Cf) as a potential new major scene start frame. For example, the cause of the current video frame (Cf) satisfying the new scene threshold in decision block 312 may have been due to the current video frame (Cf) being a bad video frame. Block 320 may be followed by decision block 306, where video correction module 106 checks to determine whether there is another video frame (e.g., a next video frame in the sequence) to process.

Otherwise, if, at decision block 312, video correction module 106 determines that the new scene threshold is not satisfied (i.e., the number of features in the current video frame (Cf) that matched in the immediately preceding video frame (Pf) is at least the new scene threshold), decision block 312 may be followed by block 306, where video correction module 106 checks to determine whether there is another video frame (e.g., a next video frame in the sequence) to process. Here, video correction module 106 determines that the current video frame (Cf) is not a potential start of a new major scene due to a sufficient number of features matching between the current video frame (Cf) and the immediately preceding video frame (Pf).

Video correction module 106 sequentially processes the video frames of the video by performing the operations of decision block 306 to block 310 to identify the major scenes in the video.

Referring again to flow diagram 200 of FIG. 2, block 202 may be followed by decision block 204, where video correction module 106 checks to determine whether there is a major scene in the video to process. Having identified the major scenes in the video, video correction module 106 may process each major scene in the video to identify a key reference frame in each major scene based on a matching of features between two successive video frames in a major scene. Video correction module 106 can also identify the totally bad video frames in the major scene and, in some embodiments, the partially bad video frames in the major scene.

If video correction module 106 determines that there is no more major scene to process, decision block 204 may be followed by block 206, where video correction module 106 proceeds to automatically correct the video. At this stage, video correction module 106 has processed the major scenes in the video and identified the sequences of totally bad video frames and, in some embodiments, the partially bad video frames. For the identified sequences of totally bad video frames, video correction module 106 removes the sequences of totally bad video frames from the video, and merges the resulting video clips of the video to correct the video. For the identified partially bad video frames, video correction module 106 identifies a mask for each defect that needs to be fixed in each partially bad video frame, and obtains the content for each mask from either a key reference frame or a neighboring video frame or video frames in the major scene. Video correction module 106 can then patch each defect in each partially bad video frame with the content obtained for the respective mask to correct the video. For example, in the case of a stationary defect (e.g., non-moving occlusion), the content for the mask can be obtained from a neighboring video frame that does not contain the defect. Alternatively, in the case of a non-stationary defect (e.g., moving occlusion), the content for the mask can be obtained from the key reference frame in the major scene as the partially bad video frame.

Otherwise, if, at decision block 204, video correction module 106 determines that there is a major scene to process, decision block 204 may be followed by block 208, were video correction module 106 identifies a key reference frame in the major scene. In some embodiments, video correction module 106 uses the identified key reference frame in the major scene to identify totally bad video frames in the major scene.

FIG. 4 is a flow diagram illustrating an example process to identify a key reference frame in a major scene, in accordance with at least some embodiments described herein. As depicted, the process to identify a key reference frame in a major scene may begin with block 402, where video correction module 106 checks to determine whether there is a current video frame in the major scene to process. Here, video correction module 106 is checking to determine whether there is a video frame in the major scene that still needs to be processed to determine whether the video frame is a possible key reference frame in the major scene. If video correction module 106 determines that there is a video frame to process, video correction module 106 identifies the video frame as a current video frame. Having identified a current video frame to process, decision block 402 may be followed by block 404, where video correction module 106 determines a total number of times the features in the current video frame matches with any of the other video frames in the major scene. Video correction module 106 can match the features in the current video frame with each of the other video frames in the video scene to determine the total number of times the features in the current video frame matched. For example, video correction module 106 may use ORB to match the features between the current video frame and each of the other video frames in the major scene.

Block 404 may be followed by block 406, where video correction module 106 determines a mean number of features matched for the current video frame. For example, the mean number of features matched for the current video frame can be determined by dividing the total number of times the features in the current video frame matched by the total number of other video frames in the major scene. Block 406 may be followed by decision block 402, where video correction module 106 checks to determine whether there is another video frame (e.g., the next video frame) in the major scene to process.

Otherwise, if, at decision block 402, video correction module 106 determines that there is no more video frame to process, decision block 402 may be followed by block 408, where video correction module 106 sorts the video frames in the major scene based on the respective mean number of features matched for each video frame. For example, sorting the video frames in this manner may allow for quicker search and retrieval.

Block 408 may be followed by block 410, where video correction module 106 identifies the video frame with the largest mean number of features matched as a key reference frame in the major scene. At this stage, video correction module 106 would have identified the key reference frame in the major scene for use in, for example, identifying the totally bad video frames in the major scene.

Referring again to flow diagram 200 of FIG. 2, block 208 may be followed by block 210, where video correction module 106 identifies the totally bad video frames in the major scene. For example, a totally bad video frame may be a video frame in which the majority of the frame is comprised of bad content (bad data), and which is to be removed from the video to correct the video.

FIG. 5 is a flow diagram illustrating an example process to identify totally bad video frames in a major scene, in accordance with at least some embodiments described herein. As depicted, the process to identify totally bad video frames in a major scene may begin with block 502, where video correction module 106 checks to determine whether there is a current video frame in the major scene to process. Here, video correction module 106 is checking to determine whether there is a video frame in the major scene that still needs to be processed to determine whether the video frame is a totally bad video frame in the major scene. If video correction module 106 determines that there is a video frame to process, video correction module 106 identifies the video frame as a current video frame. Having identified a current video frame to process, decision block 502 may be followed by block 504, where video correction module 106 matches the features of the current video frame with the key reference frame in the major scene. For example, video correction module 106 may use ORB to match the features between the current video frame and the key reference frame.

Block 504 may be followed by decision block 506, where video correction module 106 checks to determine whether the match of the features in the current video frame with the key reference frame satisfies a totally bad frame threshold. That is, video correction module 106 checks to determine whether the number of features in the current video frame that matched with (e.g., were found in) the key reference frame is less than the totally bad frame threshold. If video correction module 106 determines that the totally bad frame threshold is satisfied (i.e., the number of features in the current video frame that matched in the key reference frame is less than the totally bad frame threshold), decision block 506 may be followed by block 508, where video correction module 106 identifies (e.g., indicates) the current video frame as a totally bad video frame. Here, a significant number of features in the current video frame not matching with the key reference frame serve as an indication that there is sufficient difference between the contents of the current video frame and the key reference frame to conclude that the current video frame is a totally bad video frame in the major scene. Block 508 may be followed by decision block 502, where video correction module 106 checks to determine whether there is another video frame (e.g., the next video frame) in the major scene to process.

Otherwise, if, at decision block 506, video correction module 106 determines that the totally bad frame threshold is not satisfied (i.e., the number of features in the current video frame that matched in the key reference frame is at least the totally bad frame threshold), decision block 506 may be followed by decision block 502, where video correction module 106 checks to determine whether there is another video frame (e.g., the next video frame) in the major scene to process. Here, video correction module 106 determines that the current video frame is not a totally bad video frame due to a sufficient number of features matching between the current video frame and the key reference frame.

Otherwise, if, at decision block 502, video correction module 106 determines that there is no more video frame to process, decision block 502 may be followed by block 510, where video correction module 106 identifies the sequences of totally bad video frames in the major scene. For example, identifying the sequences of totally bad video frames may allow for efficient removal of the totally bad video frames and, as a result, quicker correction of the video.

Referring again to flow diagram 200 of FIG. 2, block 210 may be followed by block 212, where video correction module 106 identifies the partially bad video frames in the major scene. For example, a partially bad video frame may be a video frame in which small portions or areas of the frame is comprised of bad content (bad data), and which is to be fixed to correct the video.

FIG. 6 is a flow diagram illustrating an example process to identify partially bad video frames in a major scene, in accordance with at least some embodiments described herein. As depicted, the process to identify partially bad video frames in a major scene may begin with block 602, where video correction module 106 checks to determine whether there is a current video frame in the major scene to process. Here, video correction module 106 is checking to determine whether there is a video frame in the major scene that still needs to be processed to determine whether the video frame is a partially bad video frame in the major scene. If video correction module 106 determines that there is a video frame to process, video correction module 106 identifies the video frame as a current video frame. Having identified a current video frame to process, decision block 602 may be followed by block 604, where video correction module 106 divides the current video frame into a multiple number of tiles. For example, the current video frame may be divided into multiple tiles of a specific size.

Block 604 may be followed by block 606, where video correction module 106 adaptively matches the features in the tiles of the current video frame with an immediately preceding video frame in the major scene. For example, video correction module 106 may use ORB to match the features between the current video frame and the immediately preceding video frame.

Block 606 may be followed by decision block 608, where video correction module 106 checks to determine whether the adaptive match of the features in the tiles of the current video frame with the immediately preceding video frame satisfies a partially bad frame threshold. That is, video correction module 106 checks to determine, for each tile of the current video frame, whether the number of features in a tile of the current video frame that matched with (e.g., were found in) the immediately preceding video frame is less than the partially bad frame threshold. If video correction module 106 determines that the partially bad frame threshold is satisfied (i.e., the number of features in a tile of the current video frame that adaptively matched in the immediately preceding video frame is less than the partially bad frame threshold, for any tile of the current video frame), decision block 608 may be followed by block 610, where video correction module 106 identifies (e.g., indicates) the current video frame as a partially bad video frame. Here, a significant number of features in at least one tile of the current video frame not adaptively matching with the immediately preceding video frame serve as an indication that there is sufficient difference between the contents of at least one tile of the current video frame and the immediately preceding video frame to conclude that the current video frame is a partially bad video frame in the major scene.

Block 610 may be followed by block 612, where video correction module 106 maintains a record of the bad tiles in the current video frame that is identified as being a partially bad video frame. The bad tiles in the current video frame are the tiles that did not satisfy the partially bad frame threshold when adaptively matched with the immediately preceding video frame. Block 612 may be followed by decision block 602, where video correction module 106 checks to determine whether there is another video frame (e.g., the next video frame) in the major scene to process.

Otherwise, if, at decision block 608, video correction module 106 determines that the partially bad frame threshold is not satisfied (i.e., the number of features in a tile of the current video frame that adaptively matched in the immediately preceding video frame is at least the partially bad frame threshold, for all tiles of the current video frame), decision block 608 may be followed by decision block 602, where video correction module 106 checks to determine whether there is another video frame (e.g., the next video frame) in the major scene to process. Here, video correction module 106 determines that the current video frame is not a partially bad video frame due to a sufficient number of features adaptively matching between all tiles of the current video frame and the immediately preceding video frame.

Otherwise, if, at decision block 602, video correction module 106 determines that there is no more video frame to process, decision block 602 may be followed by block 614, where video correction module 106 identifies the sequences of partially bad video frames in the major scene. A sequence of partially bad video frames may include the partially bad video frames that commonly include a bad tile. In some embodiments, video correction module 106 may combine neighboring bad tiles, or bad tiles that are within a specific number of pixels from one another, to create a larger bad tile. For example, identifying the sequences of partially bad video frames may allow for efficient fixing of the partially bad video frames and, as a result, quicker correction of the video.

Referring again to flow diagram 200 of FIG. 2, block 212 may be followed by decision block 204, where video correction module 106 checks to determine whether there is another major scene in the video to process. Having identified the totally bad video frames and, in some embodiments, the partially bad video frames, in a major scene, video correction module 106 checks to determine whether there is another major scene to process or whether all the major scenes in the video have been processed.

In some embodiments, additional operations may be performed. For example, in some embodiments, video correction module 106 may provide an indication of a defect upon detecting the defect in the video. For example, video correction module 106 may execute contemporaneously with video capture module 104, and process a video as the video is being captured by video capture module 104. Video correction module 106 can then provide an indication in real-time upon detection of a stationary defect. For example, the indication may be an alert, such as a blinking light or a display of a message, which alerts a user of the detected stationary defect. In response to an alert, in some embodiments, the user may be provided an option to have video correction module 106 remove the detected defect from the video in real-time. In some embodiments, a user may be provided an option to execute video correction module 106 in real-time, for example, contemporaneously with video capture module 104.

Figure 7:
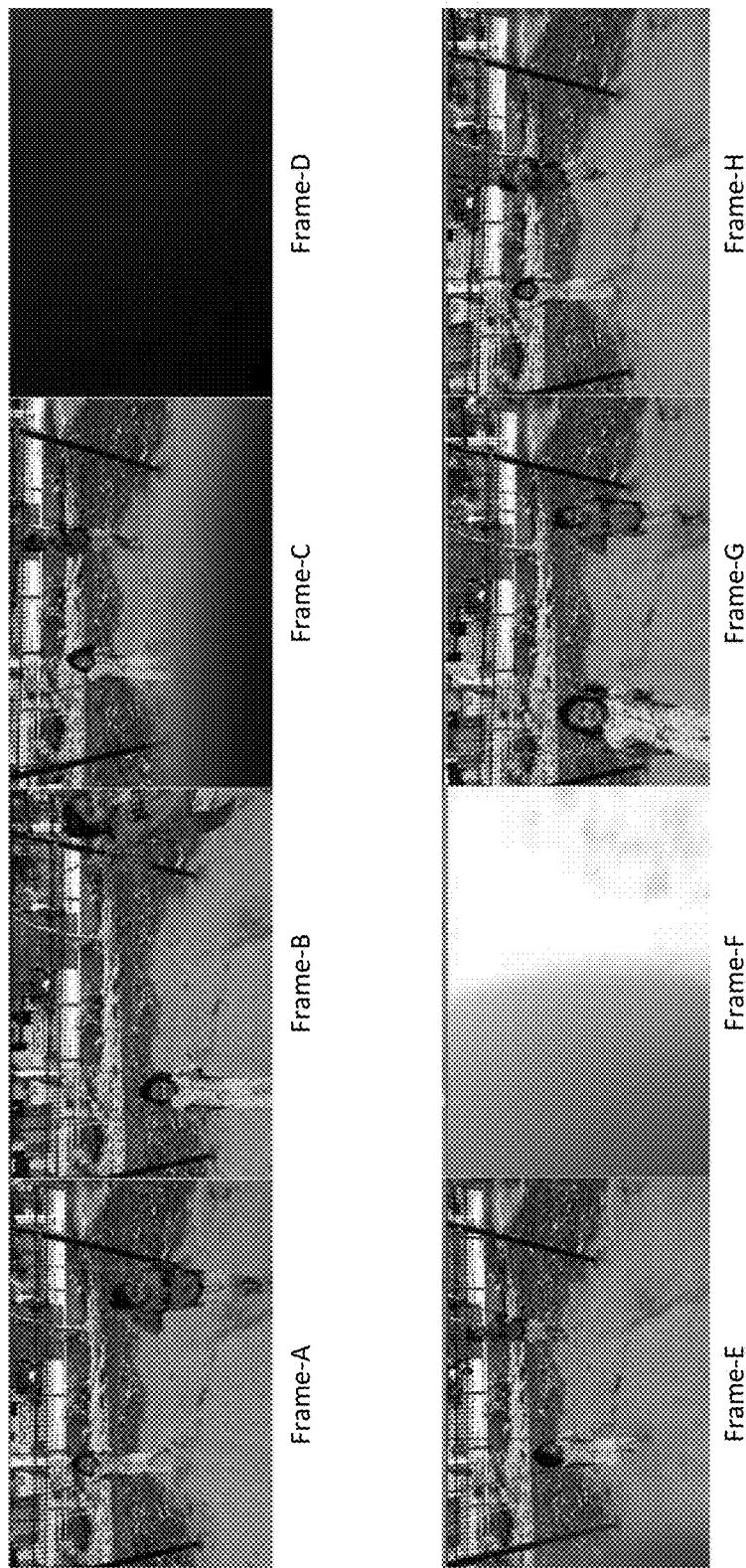
FIG. 7 is a diagram illustrating a number of partially bad and totally bad video frames included in an example sequence of video frames.

FIG. 7 is a diagram illustrating a number of partially bad and totally bad video frames included in an example sequence of video frames. The sequence of video frames may be part of a video. As depicted, the sequence of video frames includes eight video frames, Frame-A to Frame-H. In the sequence of video frames, Frame-C is a partially bad video frame that may be fixed, and Frame-D and Frame-F are totally bad video frames that may be removed to correct the video.

Figure 8A:
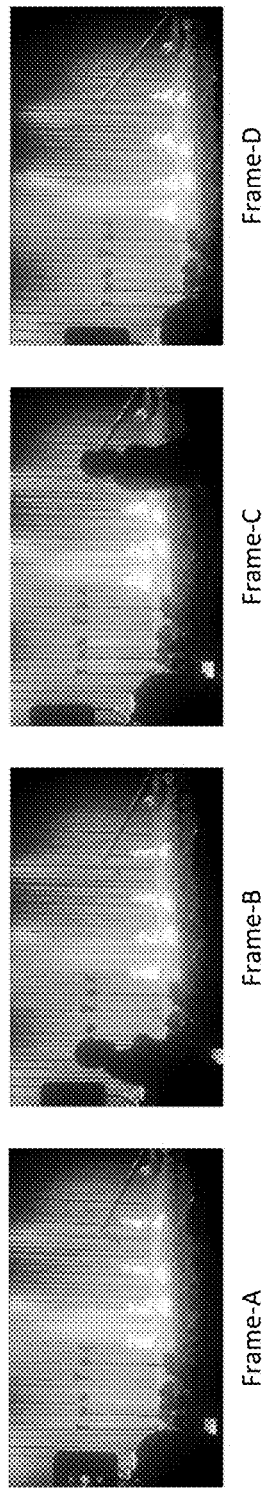
FIG. 8A is a diagram illustrating partially bad video frames included in an example sequence of video frames.
Figure 8B:
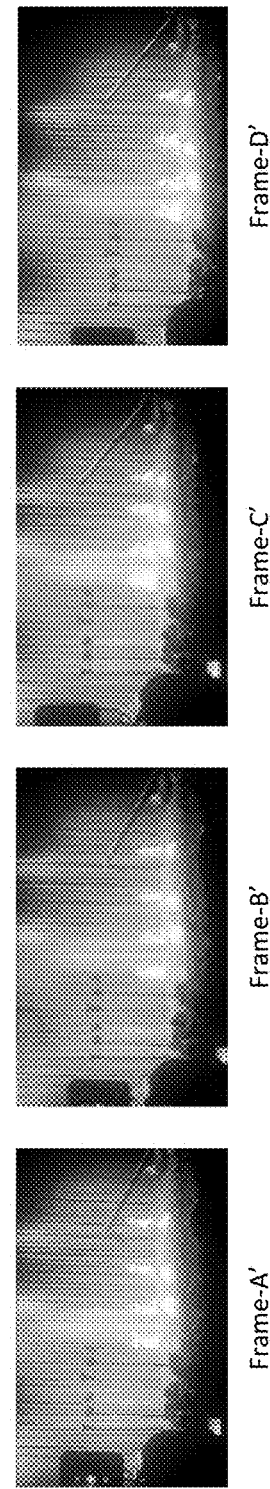
FIG. 8B is a diagram illustrating the example sequence of video frames of FIG. 8A with the partially bad video frames fixed by removal of an occlusion, in accordance with at least some embodiments described herein.

FIG. 8A is a diagram illustrating partially bad video frames included in an example sequence of video frames. As depicted, the sequence of video frames includes four video frames, Frame-A to Frame-D. In the sequence of video frames, Frame-B and Frame-C are partially bad video frames that include a moving occlusion. FIG. 8B is a diagram illustrating the example sequence of video frames of FIG. 8A with the partially bad video frames fixed by removal of an occlusion, in accordance with at least some embodiments described herein. As depicted, the moving occlusion previously identified in Frame-B and Frame-C are now fixed in corresponding Frame-B' and Frame-C'. For example, the occlusion in Frame-B may have been patched with content from neighboring Frame-A, and the occlusion in Frame-C may have been patched with content from neighboring Frame-D. Alternatively, the occlusions in Frame-B and Frame-C may have each been patched with content from both neighboring Frame-A and Frame-D.

Figure 9:
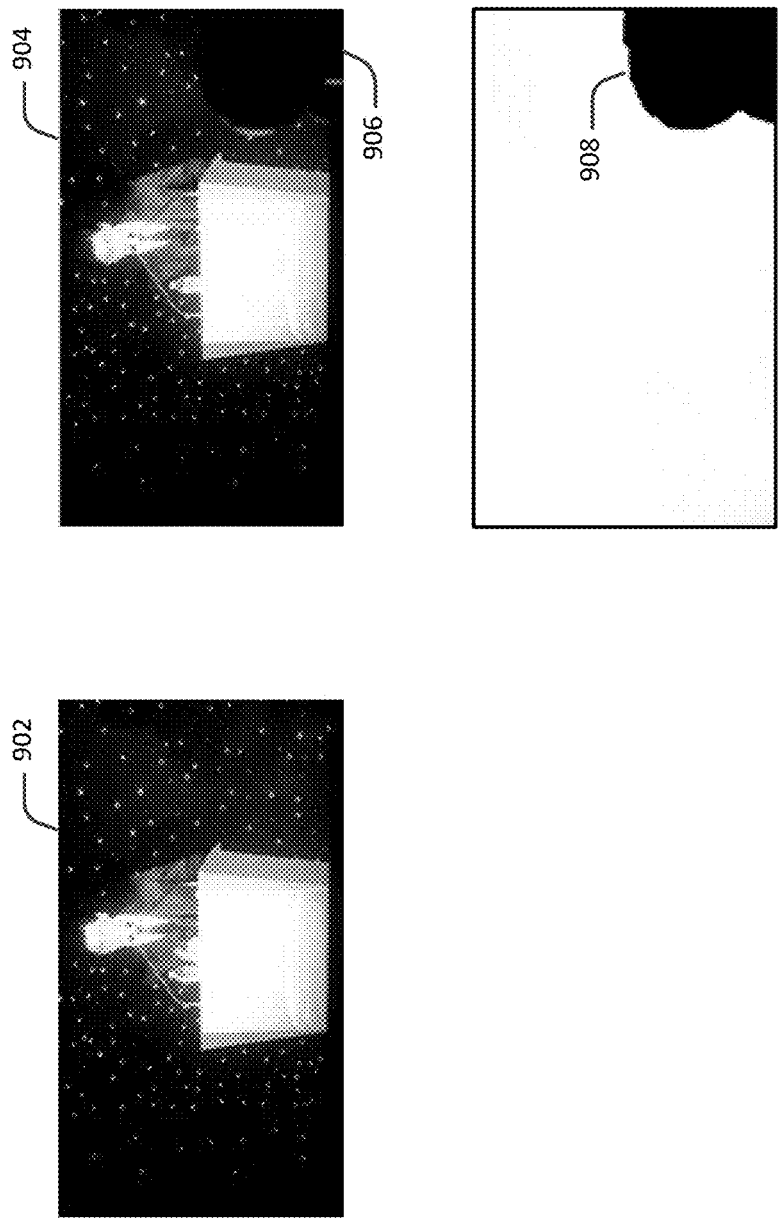
FIG. 9 is a diagram illustrating an example key reference frame, a partially bad video frame that includes an occlusion, and a mask generated for the occlusion, in accordance with at least some embodiments described herein.

FIG. 9 is a diagram illustrating an example key reference frame, a partially bad video frame that includes an occlusion, and a mask generated for the occlusion, in accordance with at least some embodiments described herein. As depicted, a video frame 902 may be a key reference frame in a major scene in a video. A video frame 904 may be a partially bad video frame in the major scene. Video frame 904 includes an occlusion 906, and a mask 908 may have been generated for occlusion 906 in video frame 904. Mask 908 may be a binary mask.

Figure 10:
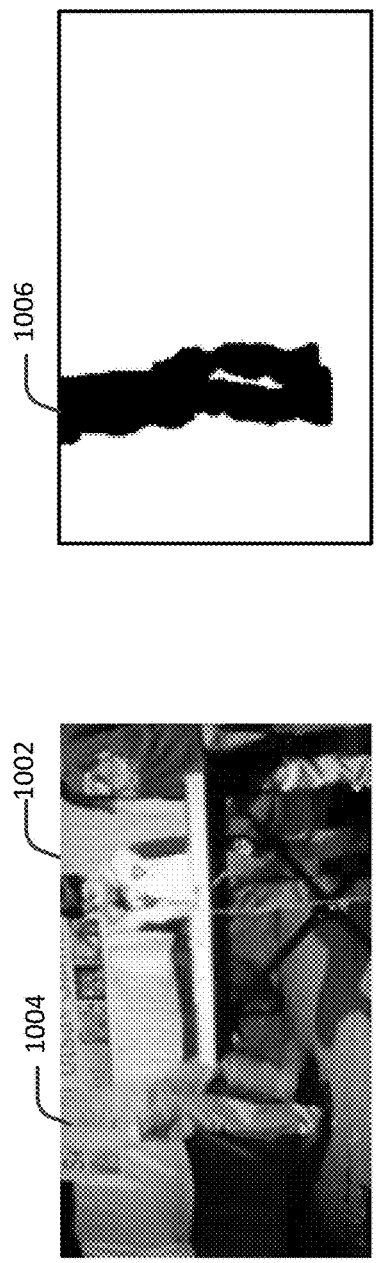
FIG. 10 is a diagram illustrating a partially bad frame including an occlusion, and a mask generated to facilitate removal of the occlusion, in accordance with at least some embodiments described herein.

FIG. 10 is a diagram illustrating a partially bad frame including an occlusion, and a mask generated to facilitate removal of the occlusion, in accordance with at least some embodiments described herein. As depicted, a video frame 1002 may be a partially bad video frame in a major scene in a video. Video frame 1002 includes an occlusion 1004, and a mask 1006 may have been generated for occlusion 1004 in video frame 1002. Mask 1006 may be a binary mask.

Figure 11:
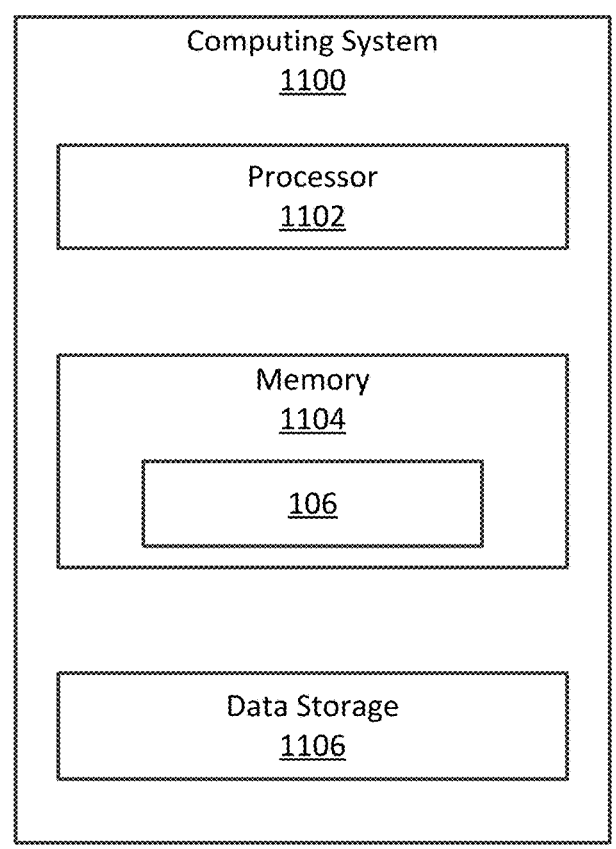
FIG. 11 illustrates selected components of an example computing system that may be used to perform any of the techniques as variously described in the present disclosure, in accordance with at least some embodiments described herein.

FIG. 11 illustrates selected components of example computing system 1100 that may be used to perform any of the techniques as variously described in the present disclosure, in accordance with at least some embodiments described herein. In some embodiments, computing system 1100 may be configured to implement or direct one or more operations associated with some or all of the engines, components and/or modules associated with automated video correction system 100. For example, video correction module 106 may be implemented in and/or using computing system 1100. In one example case, for instance, video correction module 106 is loaded in memory 1104 and executable by a processor 1102. Computing system 1100 may be any computer system, such as a workstation, desktop computer, server, laptop, handheld computer, tablet computer (e.g., the iPad™ tablet computer), mobile computing or communication device (e.g., the iPhone® mobile communication device, the Android® mobile communication device, and the like), or other form of computing or telecommunications device that is capable of video capture and/or communication and that has sufficient processor power and memory capacity to perform the operations described in this disclosure. A distributed computational system may be provided that includes a multiple of such computing devices. As depicted, computing system 1100 may include processor 1102, memory 1104, and data storage 1106. Processor 1102, memory 1104, and data storage 1106 may be communicatively coupled.

In general, processor 1102 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1102 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 11, processor 1102 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1102 may be configured to interpret and/or execute program instructions and/or process data stored in memory 1104, data storage 1106, or memory 1104 and data storage 1106. In some embodiments, processor 1102 may fetch program instructions from data storage 1106 and load the program instructions in memory 1104. After the program instructions are loaded into memory 1104, processor 1102 may execute the program instructions.

For example, in some embodiments, any one or more of the engines, components and/or modules of automated video correction system 100 may be included in data storage 1106 as program instructions. Processor 1102 may fetch some or all of the program instructions from data storage 1106 and may load the fetched program instructions in memory 1104. Subsequent to loading the program instructions into memory 1104, processor 1102 may execute the program instructions such that the computing system may implement the operations as directed by the instructions.

In some embodiments, virtualization may be employed in computing device 1100 so that infrastructure and resources in computing device 1100 may be shared dynamically. For example, a virtual machine may be provided to handle a process running on multiple processors so that the process appears to be using only one computing resource rather than multiple computing resources. Multiple virtual machines may also be used with one processor.

Memory 1104 and data storage 1106 may include computer-readable storage media for carrying or having computer-executable instructions or data structures stored thereon. Such computer-readable storage media may include any available media that may be accessed by a general-purpose or special-purpose computer, such as processor 1102. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1102 to perform a certain operation or group of operations.

Modifications, additions, or omissions may be made to computing system 1100 without departing from the scope of the present disclosure. For example, in some embodiments, computing system 1100 may include any number of other components that may not be explicitly illustrated or described herein.

As indicated above, the embodiments described in the present disclosure may include the use of a special purpose or a general purpose computer (e.g., processor 1102 of FIG. 11) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1104 of FIG. 11) for carrying or having computer-executable instructions or data structures stored thereon.

Numerous example variations and configurations will be apparent in light of this disclosure. According to some examples, computer-implemented methods for automated correction of a video including multiple video frames are described. An example computer-implemented method may include: identifying features in each video frame of the multiple video frames; identifying one or more major scenes in the video based on a matching of the features in each video frame; for each identified major scene, identifying a key reference frame based on the features in each video frame, identifying one or more bad video frames based on a comparison with the key reference frame, and identifying one or more sequences of bad video frames based on the identified one or more bad video frames; and correcting the video by removing the identified one or more sequences of bad video frames from the video.

In some examples, identifying features in each video frame may include using an Oriented Features from Accelerated Segment Test (FAST) and Rotated Binary Robust Independent Elementary Features (BRIEF) (ORB) feature detector. In other examples, identifying one or more major scenes in the video may include: matching the features in a current video frame with an immediately preceding video frame; determining whether a number of features matched with the immediately preceding video frame satisfies a new scene threshold; responsive to a determination that the number of features matched with the immediately preceding video frame satisfies the new scene threshold, identifying the current video frame as a potential new major scene start frame; determining whether a new scene confirmation threshold is satisfied; and responsive to a determination that the new scene confirmation threshold is satisfied, updating the potential new major scene start frame identification to a new major scene start frame identification. In still other examples, the key reference frame in a major scene is a video frame in the major scene with the largest mean number of features matched with all other video frames in the major scene. In yet other examples, the method may also include resizing the video to a smaller size. In further examples, identifying one or more bad video frames may include: matching the features in a current video frame with the key reference frame; determining whether a number of features matched with the key reference frame satisfies a totally bad frame threshold; and responsive to a determination that the number of features matched with the key reference frame satisfies the totally bad frame threshold, identifying the current video frame as a bad video frame. In still further examples, a bad video frame is a totally bad video frame in which more than 70% of its features fail to match with the key reference frame. In yet further examples, the method may also include: for each identified major scene, dividing a current video frame into multiple tiles of a specific size, identifying one or more bad tiles in the current video frame based on the features in each video frame, and identifying one or more sequences of partially bad video frames based on the identified one or more bad tiles; and wherein correcting the video includes fixing the identified one or more sequences of partially bad video frames. In other examples, fixing the identified one or more sequences of partially bad video frames may include identifying one or more mask areas, and patching the one or more mask areas with video content. In still other examples, the video content is from the key reference frame. In yet other examples, the video content is from a neighboring video frame.

According to some examples, systems to provide automated correction of a video including multiple video frames are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: identify features in each video frame of the multiple video frames; identify one or more major scenes in the video based on a matching of the features in each video frame; for each identified major scene, identify a key reference frame based on the features in each video frame, identify one or more bad video frames based on a comparison with the key reference frame, and identify one or more sequences of bad video frames based on the identified one or more bad video frames; and correct the video by removing the identified one or more sequences of bad video frames from the video.

In some examples, the one or more non-transitory machine readable mediums may further store instructions that, in response to execution by the one or more processors, cause the one or more processors to: for each identified major scene, divide a current video frame into multiple tiles of a specific size, identify one or more bad tiles in the current video frame based on the features in each video frame, and identify one or more sequences of partially bad video frames based on the identified one or more bad tiles; and wherein to correct the video comprises to fix the identified one or more sequences of partially bad video frames. In other examples, to identify one or more bad tiles in the current video frame based on the features in each video frame may include to adaptively match the features in the tiles of the current video frame with corresponding tiles with an immediately preceding video frame. In still other examples, to fix the identified one or more sequences of partially bad video frames may include identifying one or more mask areas, and patching the one or more mask areas with video content. In yet other examples, the video content is from at least one of the key reference frame or a neighboring video frame.

According to some examples, computer program products including one or more non-transitory machine readable mediums encoded with instructions that when executed by one or more processors cause a process to be carried out for providing automated correction of a video including multiple video frames are described. An example process may include: identifying features in each video frame of the multiple video frames; identifying one or more major scenes in the video based on a matching of the features in each video frame; for each identified major scene, identifying a key reference frame based on the features in each video frame, identifying one or more bad video frames based on a comparison with the key reference frame, and identifying one or more sequences of bad video frames based on the identified one or more bad video frames; and correcting the video by removing the identified one or more sequences of bad video frames from the video.

In some examples, identifying features in each video frame may include using an Oriented Features from Accelerated Segment Test (FAST) and Rotated Binary Robust Independent Elementary Features (BRIEF) (ORB) feature detector. In other examples, identifying one or more major scenes in the video may include: matching the features in a current video frame with an immediately preceding video frame; determining whether a number of features matched with the immediately preceding video frame satisfies a new scene threshold; responsive to a determination that the number of features matched with the immediately preceding video frame satisfies the new scene threshold, identifying the current video frame as a potential new major scene start frame; determining whether a new scene confirmation threshold is satisfied; and responsive to a determination that the new scene confirmation threshold is satisfied, updating the potential new major scene start frame identification to a new major scene start frame identification. In still other examples, identifying one or more bad video frames may include: matching the features in a current video frame with the key reference frame; determining whether a number of features matched with the key reference frame satisfies a totally bad frame threshold; and responsive to a determination that the number of features matched with the key reference frame satisfies the totally bad frame threshold, identifying the current video frame as a bad video frame.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method for automated correction of a video comprising a plurality of video frames, the method comprising:
    identifying features in each video frame of the plurality of video frames;
    identifying one or more major scenes in the video based on a matching of the features in each video frame;
    for each identified major scene,
        identifying a key reference frame in a major scene based on the features in each video frame in the major scene,
        identifying one or more bad video frames based on a comparison of features in a video frame in the major scene with features in the key reference frame, and
        identifying one or more sequences of bad video frames based on the identified one or more bad video frames; and
    correcting the video by removing the identified one or more sequences of bad video frames from the video.

2. The method of claim 1, wherein identifying features in each video frame comprises using an Oriented Features from Accelerated Segment Test (FAST) and Rotated Binary Robust Independent Elementary Features (BRIEF) (ORB) feature detector.

3. The method of claim 1, wherein identifying one or more major scenes in the video comprises:
    matching the features in a current video frame with an immediately preceding video frame;
    determining whether a number of features matched with the immediately preceding video frame satisfies a new scene threshold;
    responsive to a determination that the number of features matched with the immediately preceding video frame satisfies the new scene threshold, identifying the current video frame as a potential new major scene start frame;
    determining whether a new scene confirmation threshold is satisfied; and
    responsive to a determination that the new scene confirmation threshold is satisfied, updating the potential new major scene start frame identification to a new major scene start frame identification.

4. The method of claim 1, wherein the key reference frame in a major scene is a video frame in the major scene with the largest mean number of features matched with all other video frames in the major scene.

5. The method of claim 1, further comprising resizing the video to a smaller size.

6. The method of claim 1, wherein identifying one or more bad video frames comprises:
    matching the features in a current video frame in a major scene with features in the key reference frame in the major scene;
    determining whether a number of features matched with the key reference frame satisfies a totally bad frame threshold; and
    responsive to a determination that the number of features matched with the key reference frame satisfies the totally bad frame threshold, identifying the current video frame as a bad video frame.

7. The method of claim 1, wherein the bad video frame is a totally bad video frame in which more than 70% of its features fail to match with the key reference frame.

8. The method of claim 1, further comprising:
    for each identified major scene,
        dividing a current video frame in a major scene into a plurality of tiles of a specific size, identifying one or more bad tiles in the current video frame based on the features in each video frame in the major scene, and identifying one or more sequences of partially bad video frames based on the identified one or more bad tiles; and wherein correcting the video comprises fixing the identified one or more sequences of partially bad video frames.

9. The method of claim 8, wherein fixing the identified one or more sequences of partially bad video frames comprises identifying one or more mask areas, and patching the one or more mask areas with video content.

10. The method of claim 9, wherein the video content is from the key reference frame.

11. The method of claim 9, wherein the video content is from a neighboring video frame.

12. A system to provide automated correction of a video comprising a plurality of video frames, the system comprising:

one or more non-transitory machine readable mediums configured to store instructions; and one or more processors configured to execute the instructions stored on the one or more non-transitory machine readable mediums, wherein execution of the instructions causes the one or more processors to:

identify features in each video frame of the plurality of video frames;

identify one or more major scenes in the video based on a matching of the features in each video frame;

for each identified major scene, identify a key reference frame in a major scene based on the features in each video frame in the major scene, identify one or more bad video frames based on a comparison of features in a video frame in the major scene with features in the key reference frame, and identify one or more sequences of bad video frames based on the identified one or more bad video frames; and correct the video by removing the identified one or more sequences of bad video frames from the video.

13. The system of claim 12, wherein the one or more non-transitory machine readable mediums further stores instructions that, in response to execution by the one or more processors, cause the one or more processors to:

for each identified major scene, divide a current video frame in a major scene into a plurality of tiles of a specific size, identify one or more bad tiles in the current video frame based on the features in each video frame in the major scene, and identify one or more sequences of partially bad video frames based on the identified one or more bad tiles; and wherein to correct the video comprises to fix the identified one or more sequences of partially bad video frames.

14. The system of claim 13, wherein to identify one or more bad tiles in the current video frame based on the features in each video frame comprises to adaptively match the features in the tiles of the current video frame with corresponding tiles of an immediately preceding video frame.

15. The system of claim 13, wherein to fix the identified one or more sequences of partially bad video frames comprises identifying one or more mask areas, and patching the one or more mask areas with video content.

16. The system of claim 15, wherein the video content is from at least one of the key reference frame or a neighboring video frame.

17. A computer program product including one or more non-transitory machine readable mediums encoded with instructions that when executed by one or more processors cause a process to be carried out for providing automated correction of a video comprising a plurality of video frames, the process comprising:

identifying features in each video frame of the plurality of video frames;

identifying one or more major scenes in the video based on a matching of the features in each video frame;

for each identified major scene, identifying a key reference frame in a major scene based on the features in each video frame in the major scene, identifying one or more bad video frames based on a comparison of features in a video frame in the major scene with features in the key reference frame, and identifying one or more sequences of bad video frames based on the identified one or more bad video frames; and correcting the video by removing the identified one or more sequences of bad video frames from the video.

18. The computer program product of claim 17, wherein identifying features in each video frame comprises using an Oriented Features from Accelerated Segment Test (FAST) and Rotated Binary Robust Independent Elementary Features (BRIEF) (ORB) feature detector.

19. The computer program product of claim 17, wherein identifying one or more major scenes in the video comprises:

matching the features in a current video frame with an immediately preceding video frame;

determining whether a number of features matched with the immediately preceding video frame satisfies a new scene threshold;

responsive to a determination that the number of features matched with the immediately preceding video frame satisfies the new scene threshold, identifying the current video frame as a potential new major scene start frame;

determining whether a new scene confirmation threshold is satisfied; and responsive to a determination that the new scene confirmation threshold is satisfied, updating the potential new major scene start frame identification to a new major scene start frame identification.

20. The computer program product of claim 17, wherein identifying one or more bad video frames comprises:

matching the features in a current video frame in the major scene with features in the key reference frame;

determining whether a number of features matched with the key reference frame satisfies a totally bad frame threshold; and responsive to a determination that the number of features matched with the key reference frame satisfies the totally bad frame threshold, identifying the current video frame as a bad video frame.

\* \* \* \* \*